Dec. 25, 1951 H. L. PITMAN 2,580,318

POWER OPERATED TABULATING MECHANISM
FOR TYPEWRITING MACHINES

Filed Aug. 20, 1948 6 Sheets-Sheet 1

INVENTOR
HENRY L. PITMAN
BY Jesse A. Holton
ATTORNEY

INVENTOR
HENRY L. PITMAN
BY Jesse A. Holton
ATTORNEY

INVENTOR
HENRY L. PITMAN
BY Jesse A. Holton
ATTORNEY

INVENTOR.
HENRY L. PITMAN
BY Jesse A. Holton
ATTORNEY

INVENTOR
HENRY L. PITMAN
BY Jesse A. Holton
ATTORNEY

Dec. 25, 1951 H. L. PITMAN 2,580,318

POWER OPERATED TABULATING MECHANISM
FOR TYPEWRITING MACHINES

Filed Aug. 20, 1948 6 Sheets-Sheet 6

INVENTOR
HENRY L. PITMAN
BY Jene A. Holton
ATTORNEY

Patented Dec. 25, 1951 2,580,318

UNITED STATES PATENT OFFICE 2,580,318

POWER OPERATED TABULATING MECHANISM FOR TYPEWRITING MACHINES

Henry L. Pitman, Melbourne, Fla., assignor to Underwood Corporation, New York, N. Y., a corporation of Delaware Application August 20, 1948, Serial No. 45,373

13 Claims. (Cl. 197—178)

Figure 1:
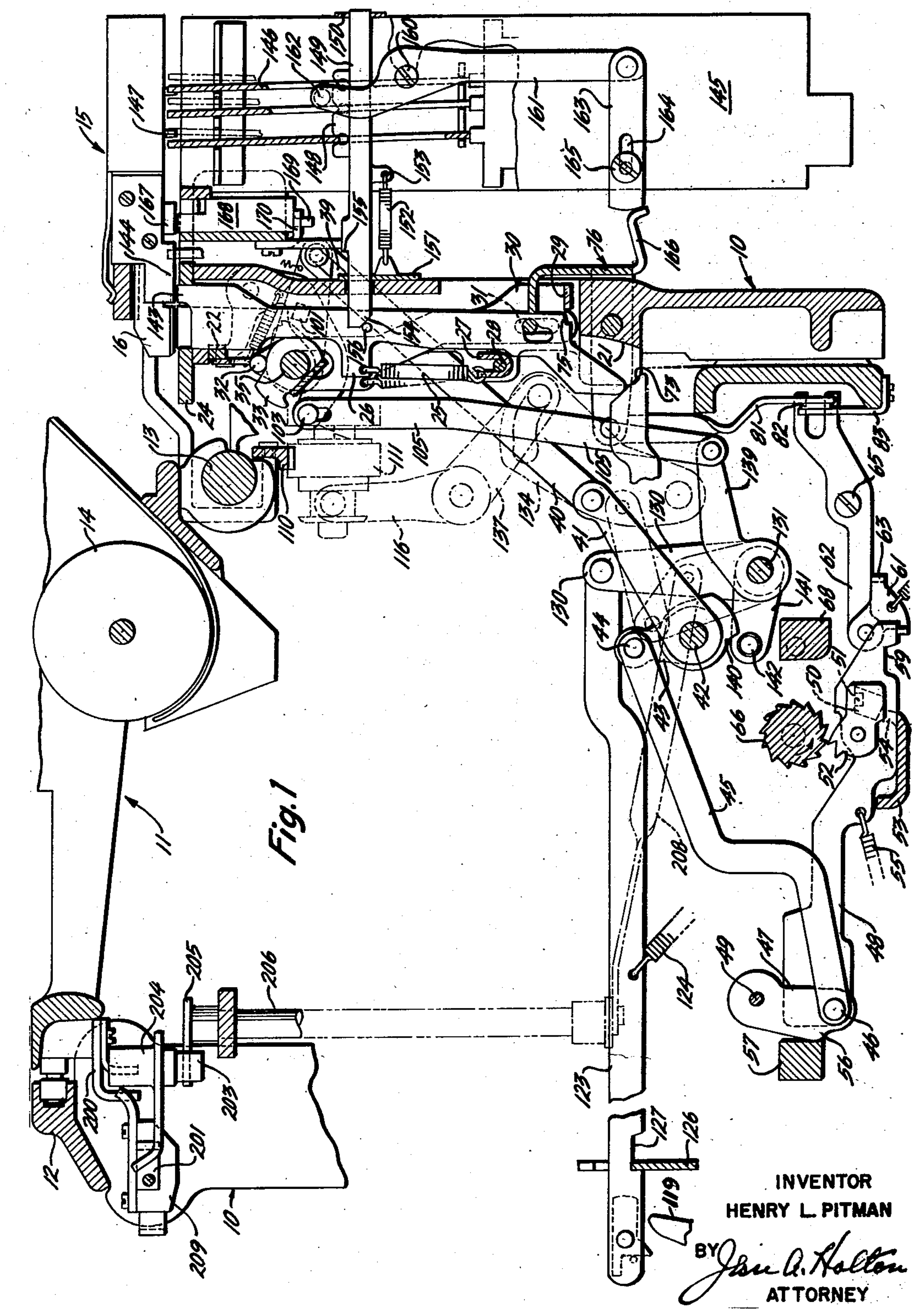

This invention relates in general to typewriting machines and particularly to a tabulator mechanism therefor. In its broadest aspects, the invention is equally adaptable to typewriters of the flat platen type wherein a type head is generally movable in a letter-feeding direction while the platen remains stationary, and to machines of the cylindrical platen type wherein the platen is generally moved in a letter-feeding direction while the keyboard or base of the machine remains stationary.

Certain features of the invention lend themselves particularly well to use in a combined typewriting and computing machine, although it is to be understood that such features may also be adapted to typewriting machines which do not have calculating machine features.

A general object of the invention is to provide an improved, reliably operable, power denominational or decimal tabulator mechanism.

Another object of the invention is to provide an arrangement whereby the carriage or other letter-feeding part may be manually interrupted during a tabulating run and returned to line-start position or to any desired intermediate position.

A further object of the invention is to provide, in a typewriting machine wherein the letter-spaceable part is returned by power, an arrangement whereby depression of a tabulator key will immediately disconnect such power return and restore the carriage to the control of the tabulator mechanism.

A still further object of the invention is to provide an arrangement whereby the tabulator mechanism will be rendered ineffective after tabulating to certain zones until after the letter-spaceable part of the machine has been letter-spaced step by step through such zones.

These and further objects, features and advantages of the invention will more readily appear as the description of certain preferred embodiments proceeds.

Figures 2, 9, 10:
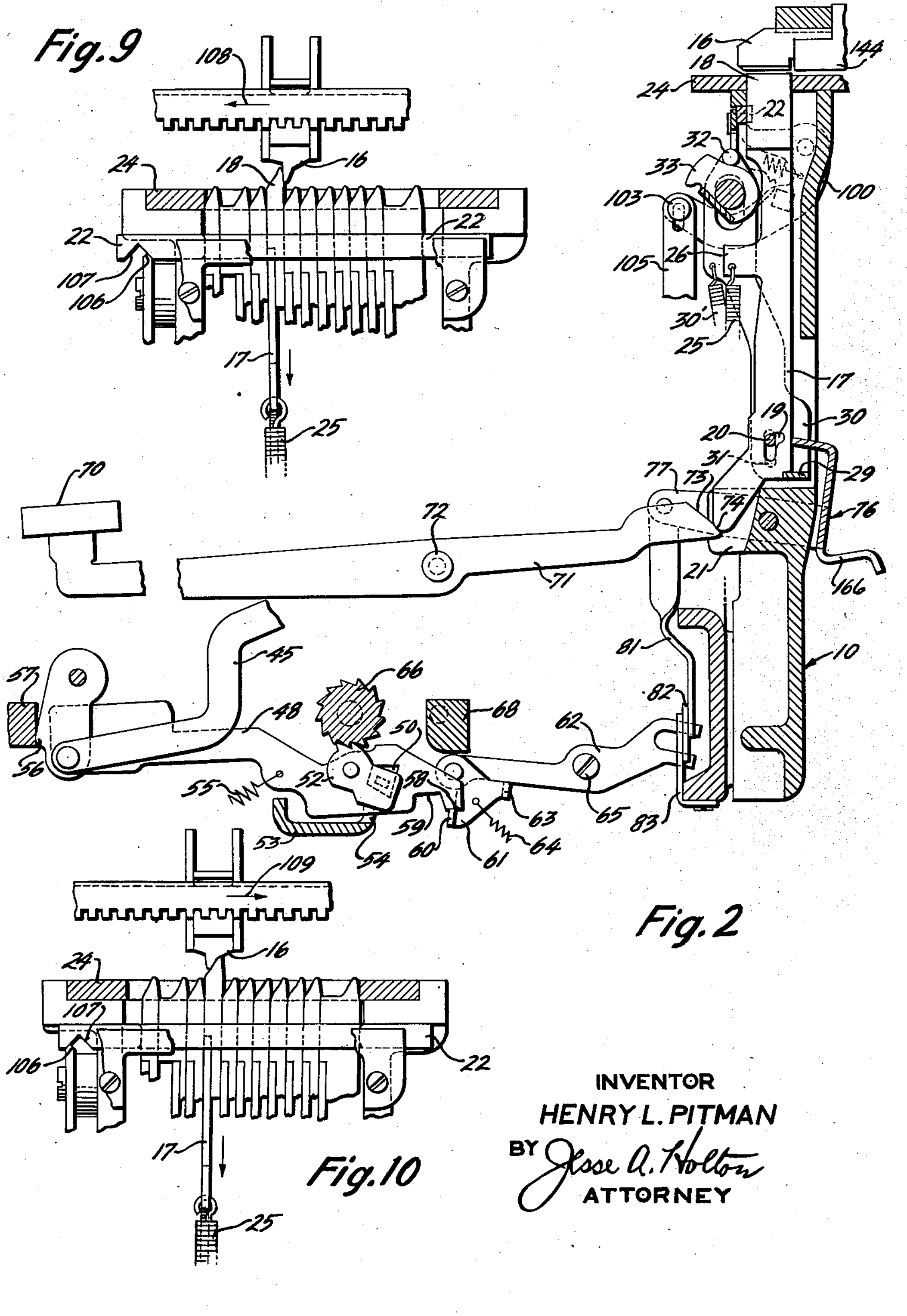
Figures 3, 7, 8:
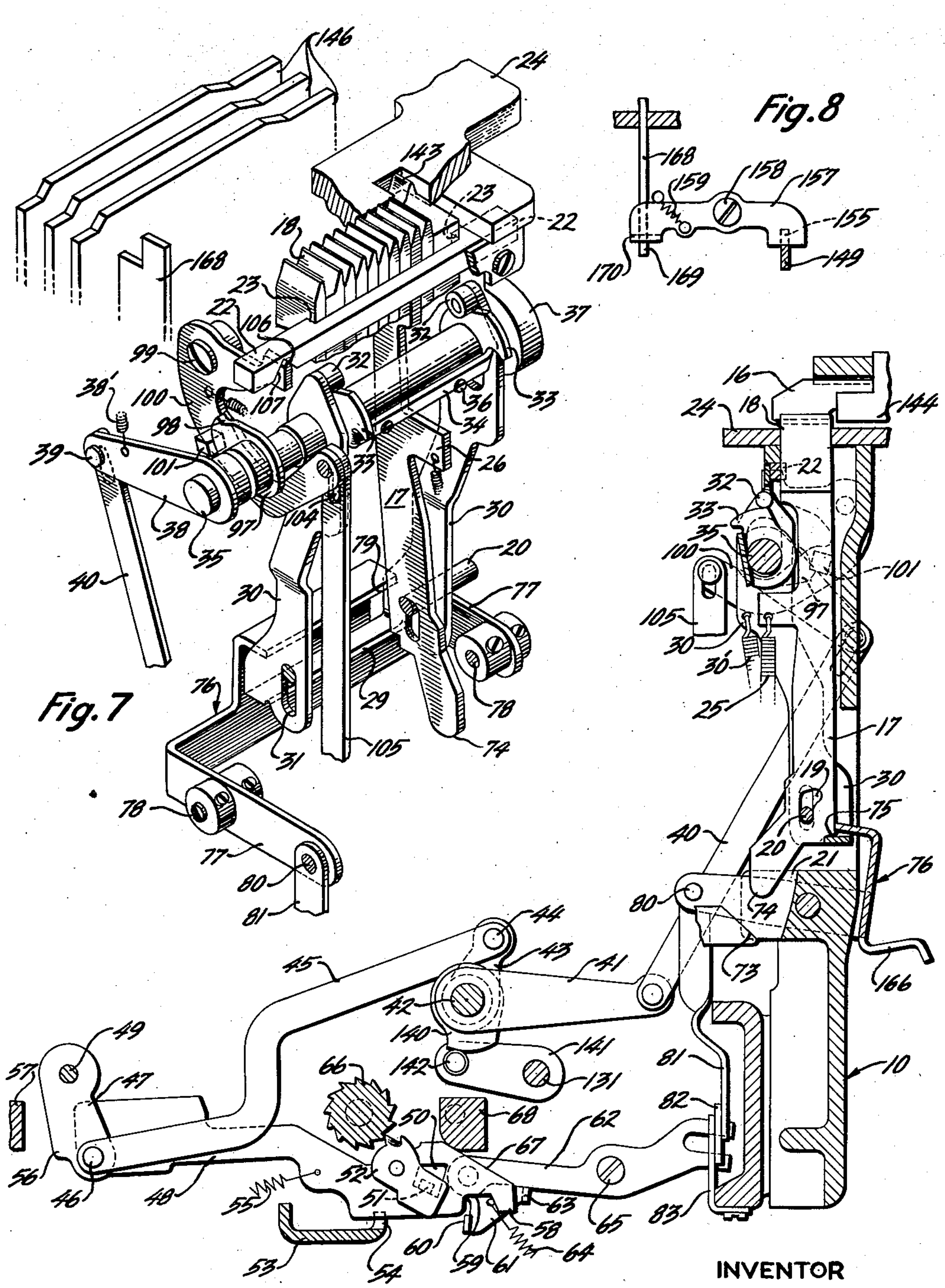
Figure 13:
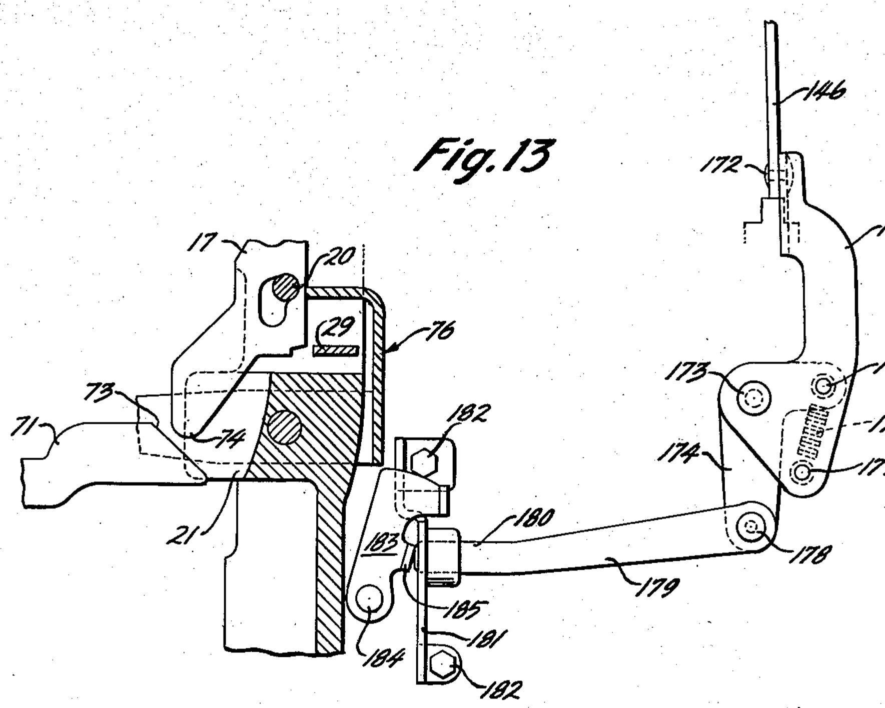
Figures 4, 12:
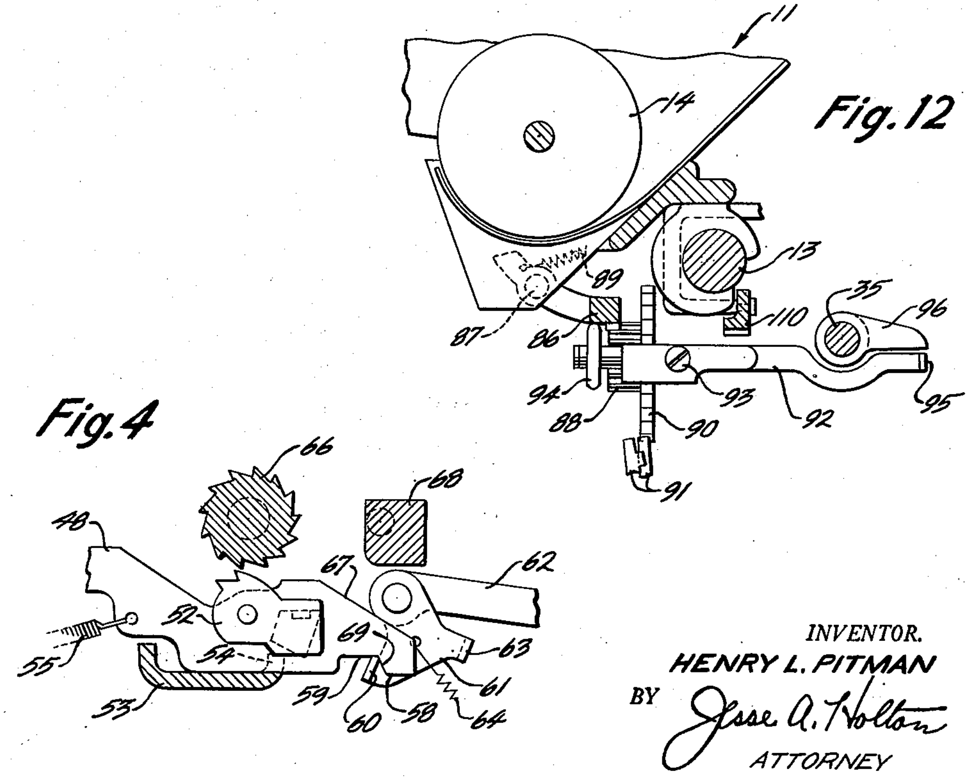
Figures 5, 6:
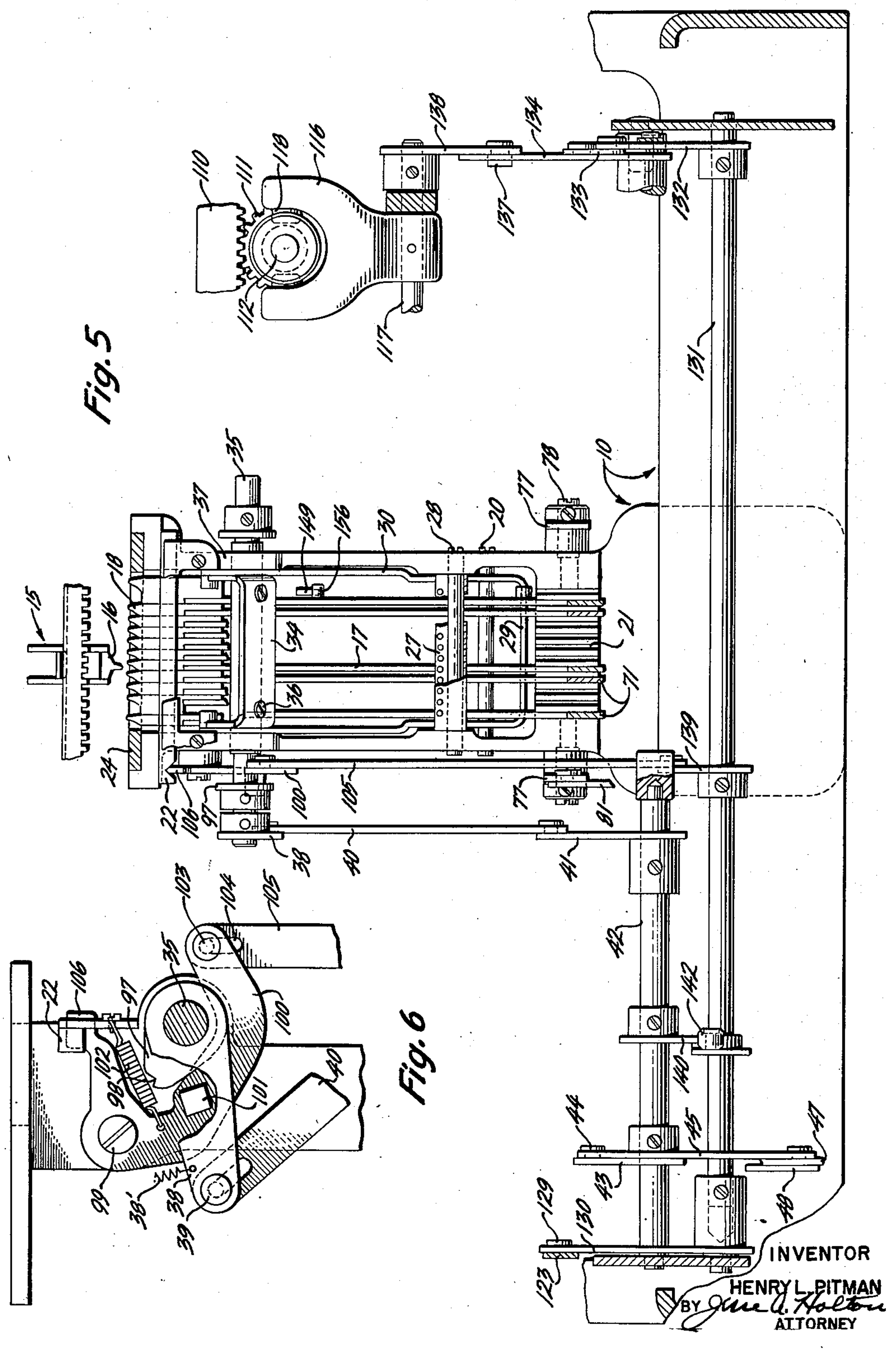
Figure 11:
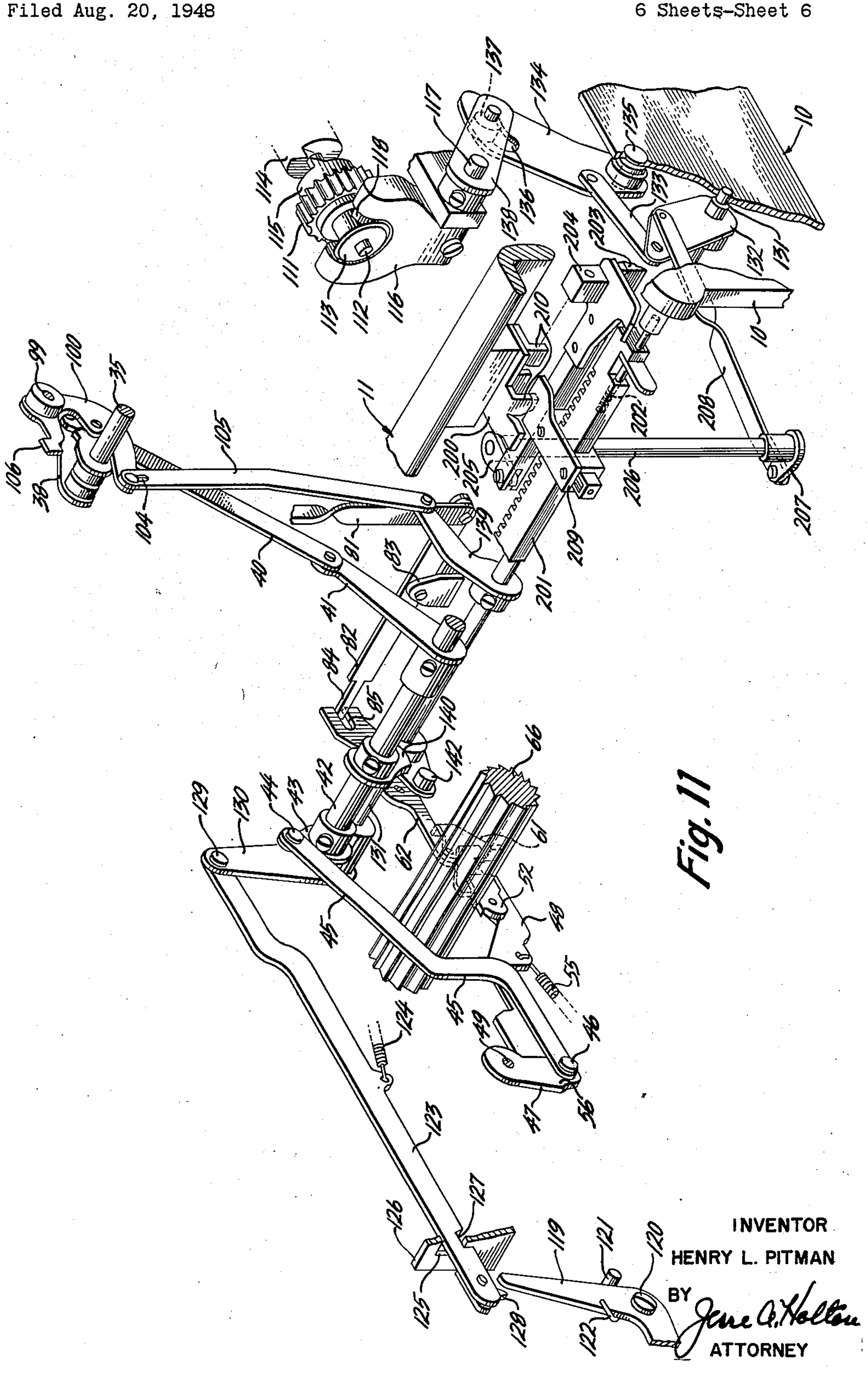

Referring now to the drawings:

Fig. 1 is a vertical section through the machine, many of the parts being omitted in order to more clearly show the present invention, Fig. 2 is a view showing a part of the tabulating mechanism at the moment that a counter-stop or reed has been selected for projection to a tabulating stopping position, Fig. 3 is a view similar to Fig. 2 but showing the position of the parts immediately after the selected reed has been moved to tabulation stopping position, Fig. 4 is a detail view showing a portion of the power operating means for lifting the tabulator reeds, taken while a tabulating run is in progress, Fig. 5 is a front elevation showing the denominational tabulator reeds in their normal positions and also showing a portion of the power return mechanism for the carriage, Fig. 6 is a detail view of a latch for holding a projected tabulator reed in projected position during a tabulating run, Fig. 7 is a perspective view of part of the mechanism for projecting the tabulator reeds to tabulation stopping position, Fig. 8 is a detail view of part of the mechanism for preventing tabulation in certain zones, Fig. 9 is a detail view showing the upper ends of the tabulator reeds at the time that one of the reeds is being struck by a carriage carried tabulator stop in a letter-feeding direction, Fig. 10 is a view similar to Fig. 9 but showing the position of the parts at the time that a tabulator reed is being struck in a carriage return direction, Fig. 11 is a perspective view of the carriage power return mechanism, Fig. 12 is a detail view of the means for releasing the usual escapement mechanism when a tabulator reed is moved to tabulation stopping position, and Fig. 13 is a detail view of a portion of the mechanism for preventing tabulation in certain zones in accordance with a modified form of the invention.

The invention has been illustrated as applied to a combined typewriting and computing machine, but it will become obvious as the description progresses that the invention is equally applicable to typewriting machines which do not have computing machine features.

In Fig. 1 the base portion of the typewriting unit is generally indicated at 10 and the paper carriage at 11. The carriage 11 is mounted for reciprocatory movement upon front and rear rails, designated 12 and 13, respectively, and carries the usual cylindrical platen 14.

The carriage may be provided with a plurality of column units, one of which is generally designated in Fig. 1 at 15. Each of the column units will be provided with a tabulator stop 16 and may be provided with additional stops or tappets, as will later appear. The details of construction of such column units form no part of the present invention, but they may conveniently be constructed as particularly described in my prior Patent No. 2,216,627.

For cooperating with the tabulator stop 16, a plurality of decimal, or denominational, tabulator counter-stops are provided. Each of the counter-stops is in the form of a reed 17 having an enlarged head portion 18. The lower portion of each reed is provided with an angled opening 19 through which extends a guide rod 20. The rod 20 is suitably fixed in the base portion of the machine.

Slots 21 provided in the base 10 space the lower ends of the reeds 17 apart and limit their movement to a vertical plane. The enlarged head portions 18 abut one another to maintain a parallel relation between the reeds. The head portions 18 are maintained in light abutment by a bar 22 which is cut away to provide shoulders 23 fitted against the edge of the two outermost reeds, as best seen in Fig. 7. A cover plate 24 limits the fore-and-aft movement of the upper ends of the reeds.

For normally maintaining the reeds 17 in an inactive position, each reed is provided with a spring 25 connected to an arm 26 of the reed and suitably anchored to the framework, as by means of a saddle 27 extending around a cross-rod 28.

For projecting any desired reed into the path of the tabulator stop 16, a universal bail 29, provided with a pair of side arms 30, is employed. Each side arm 30 is provided with an elongated slot 31 through which extends the previously mentioned rod 20 for guiding the lower ends of the arms and consequently guiding the bail 29. The upper end of each side arm 30 is provided with a cam roller 32 resting upon a cam 33 for a purpose to be presently explained. Springs 30′, connected to the side arms 30 and anchored upon the cross-rod 28, tend to hold the universal bail in its normal lowered position.

The cams 33 are integrally formed and are connected by a strip 34. The strip 34 is connected to a rock shaft 35 by means of screws 36, or otherwise, so that the cams 33 are constrained to move with said rock shaft. The rock shaft 35 is rotatably mounted between a pair of ears 37 formed on the framework, as best seen in Figs. 5 and 7. It will readily be appreciated that when the rock shaft 35 is rotated clockwise from the position shown in Fig. 1, the bail 29 will be raised due to the rollers 32 riding up on the cams 33.

Fixed to the rock shaft 35 is an arm 38 which is connected by a pin-and-slot connection 39 to one end of a link 40. The opposite end of link 40 is pivotally connected to one end of an arm 41 fixed to a cross-shaft 42. A spring 38′ has one end connected to the arm 38 and is anchored at its other end to a stationary part of the machine. Spring 38′ tends to rotate the shaft 35 in a clockwise direction, as viewed in Fig. 6. Also fixed to said cross-shaft is an arm 43 which is pivotally connected at 44 to one end of a link 45. The opposite end of link 45 is pivotally connected by a pin 46 to a supporting pendant 47 and to a power actuable draw-link 48. The pendant 47 has a stationary pivot 49.

The rear end of draw-link 48 is provided with an opening 50 to accommodate a weighted tab 51 fixed to a toothed pawl 52 pivotally mounted upon said draw-link. The draw-link 48 is guided for reciprocatory movement by a guide comb 53 having a slot 54 for accommodating said draw-link. The lower edge of the toothed pawl 52 normally rests upon said guide comb adjacent the slot 54, as may be seen in Fig. 1. Draw-link 51 is resiliently held in the Fig. 1 position by a spring 55, said draw-link being prevented from moving to the left by a shoulder 56 on the pendant 47 abutting a stationary crossbar 57.

The draw-link 48 is provided on its rear end with a foot 58 formed by cutting away a part of said draw-link as at 59. The foot 58 normally rests lightly upon a tab 60 formed on a dog 61. The dog 61 is pivotally mounted upon one end of a lever 62 and is provided with a second tab 63 which is held against the bottom of said lever by a spring 64 fixed at one end to a pin on said dog and at its other end to a stationary part of the machine. The lever 62 is pivotally mounted upon a stationary part of the machine by means of a screw 65, or otherwise, and is operated by mechanism to be presently described.

Referring now to Figs. 1–4, it will be observed that when the lever 62 is rocked clockwise from the Fig. 1 position, the draw-link 48 will be raised, due to the tab 60 pushing up on the foot 58, until the toothed pawl 52 comes into contact with a continuously rotating fluted power shaft 66.

Fig. 2 shows the position of the parts at the moment that pawl 52 contacts shaft 66, and it may be seen that at that time the pawl 52 has started to rotate about its pivot in a clockwise direction due to the off balance of said pawl caused by the weighted tab 51, the lower edge of said pawl having been lifted from the guide comb 53.

In the Fig. 3 position, the draw-link 48 has been moved to the right due to the action of the shaft 66 on the toothed pawl 52 until an inclined surface 67 of said link has contacted a knock-off block 68. The toothed pawl 52 has rotated clockwise to its fullest extent until the weighted tab 51 has hit against the bottom edge of the opening 50. It is also to be observed in this figure that the foot 58 has moved away from the tab 60 on dog 61 and that said tab is now positioned beneath the cut-away portion 59.

As the inclined surface 67 strikes the knock-off block 68, it causes the draw-link 48 to move downward to a point where the toothed pawl 52 is no longer in contact with the shaft 66, as may be seen in Fig. 4. As the pawl 52 leaves contact with shaft 66, the spring 55 returns the draw-link 48 to its original Fig. 1 position wherein the lower edge of pawl 52 is resting upon the guide comb 53 adjacent guide slot 54. If the lever 62 is held in its clockwise rocked position, as shown in Fig. 4, then as draw-link 48 moves from the Fig. 3 position to the Fig. 4 position, the cut-away portion 59 will move down over the tab 60 and the rear edge 69 of said cut-away portion will draw the tab 60 to the left and thereby rock the dog 61 in a clockwise direction until the tab 63 of said dog is no longer in contact with the lower edge of lever 62. It will readily be apparent that as long as lever 62 remains rocked, as in Fig. 4, the toothed pawl 52 will not again be moved into contact with the shaft 66. The pin-and-slot connection 39 permits the link 40 to return to its Fig. 1 position without further affecting the arm 38.

When the toothed pawl 52 is moved into contact with the shaft 66 to thereby move the draw-link 48 toward the rear of the machine, to the right as seen in the drawings, the link 45 will, of course, also move to the right due to the pivotal connection 46. As the upper end of link 45 moves to the right, the arm 43 will cause the cross-shaft 42 to rock clockwise to thereby move the arm 41 downward and, through the link 40, pull down on the end of arm 38. As the rear end of arm 38 is moved downward, the shaft 35 is rocked clockwise, as viewed in Fig. 1, to thereby cause the bail 29 to be raised from the Fig. 1 position to the Fig. 2 position, as previously explained.

By referring to Figs. 1 and 7, it will be noted that the bail 29 is normally positioned rearwardly of the lower ends of the tabulator reeds 17 so that should said bail be raised when the reeds are in the position shown in Figs. 1 and 5, no motion will be imparted to said reeds. The reeds 17 are individually selectable for movement by said bail by means of a set of the usual decimal tabulator keys. Only one tabulator key 70 has been shown in Fig. 2, but it is to be understood that there is a key corresponding to each of the reeds. The tabulator keys are carried by levers 71 suitably mounted, as by a pivot 72. Several of the tabulator key levers are shown in section in Fig. 5.

The rearmost end of each tabulator lever is beveled as at 73 and is fitted within, and guided by, the slot 21 which guides the lower end of the tabulator reed. Each tabulator reed 17 is provided with a rounded end portion 74 normally resting upon the beveled end of a key lever. Each of the tabulator reeds is also provided with a step 75, and when a tabulator key is depressed, the beveled end 73 of the lever 71 cams the lower end of the tabulator reed associated therewith to the rear and positions the step 75 upon the bail 29, rearward movement of the lower end of the reed being permitted by the angled opening 19.

A bail member 76 comprising a pair of arms 77 pivotally mounted upon the framework of the machine as by means of stub shafts 78, or otherwise, is provided with a universal feeler edge 79 which rests against the rear edges of the tabulator reeds. Pivotally connected at 80 to one end of one of the arms 77 is one end of a link 81, the opposite end of which is pivotally connected to a rockable lever 82, as best seen in Fig. 11. The lever 82 is pivotally mounted at a point intermediate its length on a stationary bracket 83 and is provided on one end with a tongue 84. The tongue 84 is fitted within a forked end 85 of the previously mentioned lever 62. Therefore, when any tabulator reed is moved rearwardly, the bail member 76 will cause the rear end of the lever 62 to be moved downward, as will readily be understood, to thereby raise the forward end of said lever and consequently move the toothed pawl 52 into engagement with the power shaft 66, as previously explained.

Thus it will be seen that when any tabulator key is depressed, the tabulator counter-stop, or reed, 17 associated therewith will have its lower end moved toward the rear to position its step 75 upon the lifting bail 29 and that rearward movement of the lower end of reed 17 will, through the train of links and levers above described, cause the toothed pawl 52 on draw-link 48 to engage the power shaft 66. It will also be apparent that as a result of the toothed pawl 52 contacting the shaft 66, the shaft 35 will be rocked clockwise, as viewed in Fig. 1, and that such clockwise rocking of shaft 35 will cause the tabulator reed whose step has been positioned upon the bail 29 to be projected into the path of movement of the tabulator stop 16.

The letter-spaceable part of a typewriting machine is commonly provided with a spring motor for driving such part in a letter-feeding direction and with an escapement mechanism which permits the letter-spaceable part to move only with a step-by-step motion in letter-feeding direction. In tabulating, it is necessary to render the escapement mechanism ineffective in order that the letter-spaceable part may move freely until interrupted by a tabulator stop. In the machine which has been chosen to illustrate the present invention, the letter-spaceable part is the paper carriage 11.

Referring now to Fig. 12, it will be seen that the carriage 11 carries a rack bar 86 pivotally mounted at 87 and urged downward into contact with a pinion 88 by a light spring 89. The pinion 88 has a one-way clutch connection with an escapement wheel 90. Pinion 88 and escapement wheel 90 are rotatably mounted upon a stationary shaft, not shown, and said escapement wheel is alternately engaged by one or the other of a pair of dogs partially indicated at 91. There is a spring motor, not shown, for urging the carriage in a letter-feeding or tabulating direction. Since the details of the escapement mechanism form no part of the present invention and may be of any conventional construction, said mechanism has been only partially shown, it being sufficient to say that the arrangement is such that while the carriage is under control of the escapement mechanism, the carriage will step forward one letter space whenever a letter or numeral is typed or the usual space bar is struck. The one-way clutch between the pinion 88 and escapement wheel 90 permits a free return of the carriage.

Referring further to Fig. 12, it will be seen that the usual escapement release lever 92 has been provided. The lever 92 is pivotally mounted at 93 and on one end carries a wheel 94. The wheel 94 rides along the lower edge of rack bar 86 in a path which is parallel to the rack bar teeth. At the end opposite the wheel 94, the lever 92 is provided with a tab 95 which extends into the path of movement of an arm 96 fixed to the previously mentioned rock shaft 35. Thus it will be seen that when the rock shaft 35 is rotated to project a tabulator reed 17 into the path of movement of the tabulator stop 16, the arm 96 will be effective to rock the lever 92 in a clockwise direction, as viewed in Fig. 12, to lift the rack bar 86 out of contact with the pinion 88 and thereby release the carriage from control by the escapement mechanism and permit said carriage to be freely moved in a tabulating direction by the spring motor associated therewith.

In order to maintain the carriage released from control by the escapement mechanism and to keep the selected reed in tabulation stopping position during the time that a tabulating run is in progress, the following mechanism is employed.

The rock shaft 35 has fixed thereto an arm 97 provided with a latch step 98, as best seen in Figs. 6 and 7. Pivotally mounted upon a stationary part of the machine as by means of a screw 99 is a latch lever 100. Latch lever 100 is provided with a square stud 101 for cooperating with the latch step 98, as will later be explained, and is urged in a counterclockwise direction, as viewed in Fig. 6, by a spring 102, one end of which is connected to said latch lever and the other end of which is anchored to the machine framework. The latch lever 100 is provided at one end with a headed stud 103 fitted within an elongated slot 104 of a link 105, the purpose of which will presently become apparent, and on its other end is provided with a beveled edge 106 fitting within a notch 107 cut into the hereinbefore mentioned bar 22, as best seen in Fig. 7.

When the rock shaft 35 is rotated to thereby project a tabulator reed and at the same time release the escapement mechanism, as previously explained, the end of arm 97 is moved downward from the position shown in Fig. 6. During its downward movement, the end of arm 97 momentarily cams the latch lever 100 clockwise against the action of spring 102 and said spring then returns the latch arm and seats the square stud 101 on the latch step 98, as may be seen in dotted lines in Fig. 3. As long as the stud 101 is seated on the step 98, the rock shaft 35 cannot return to its home position, the projected reed will, therefore, remain in a tabulation stopping position, and the escapement mechanism will remain disconnected from the carriage, as will readily be understood.

After the tabulator stop 16 strikes the projected reed 17, it is, of course, necessary that said reed be retracted in order that the carriage may be letter-spaced from the tabulation stopping position. Referring now particularly to Fig. 9, it will be observed that when any projected tabulator reed is struck by the tabulator stop 16 moving in tabulating direction, indicated by the arrow 108, the tops of all the reeds are moved to the left from their normal upright position. This universal movement is, of course, caused by the head portions of the reeds being confined by the shoulders 23 of the bar 22. As the tops of the reeds move leftward, the bar 22 will likewise move leftward and one side of the notch 107 will cam the beveled end 106 of latch lever 100 downward to thereby rock said lever in a clockwise direction, as viewed in Fig. 6. This clockwise movement of lever 100 will result in unseating the stud 101 from the latch step 97, whereupon the shaft 35 will be restored to its home position by the spring 38′ pulling up on the arm 38. The projected reed 17 will, of course, be restored by its spring 25.

The machine to which the present invention is particularly adaptable is devised for typing in several different columns. Consequently, the carriage will be provided with several tabulator stops 16. It sometimes happens that after the typing is completed in a given column, the operator will depress a tabulator key to tabulate to the next column and then while the tabulation is in progress will decide to manually return the carriage to a position corresponding to the column which has just been tabulated from. Such an operation will, of course, result in a tabulator reed being projected into a position to be struck by the tabulator stop when the carriage is moved in a return direction. In order that the carriage may be manually returned to any desired letter-space position, it is necessary that a return movement of the carriage result in retraction of the projected tabulator reed to its unprojected position.

According to the present invention, it will be seen from Fig. 10 that when any tabulator reed 17 is struck by a tabulator stop 16 in a carriage return direction, indicated by arrow 109, the tops of all the tabulator reeds will be moved to the right, as a result of the reeds' confinement by the shoulders 23 of bar 22. Rightward movement of the tops of reeds 17, of course, will result in rightward movement of the bar 22 which in turn will result in one edge of the notch 107 depressing the beveled end 106 of the latch lever 100. As the latch lever 100 is rocked by the side of notch 107 depressing the beveled end 106, the projected reed will be withdrawn from its projected position, as previously explained.

It will be appreciated that the above described means for restoring the projected tabulator reed when hit by a carriage stop in carriage return direction is equally applicable even though only one tabulator reed 17 is provided. In that case, if the tabulator reed should be projected after a carriage stop has moved past that position in a letter-feeding direction, said reed will be restored if struck in a carriage return direction. Thus it is clear that the present invention is applicable equally for paragraph or column tabulating and to decimal tabulating within a column.

Certain features of the present invention are particularly applicable to typewriting machines having a power carriage return, and, for that reason, there has been illustrated, in Figs. 1, 5 and 12, a carriage return rack 110 carried by the carriage 11. Continuously meshed with the teeth of rack 110 is a pinion 111 revolvably mounted upon a continuously driven shaft 112 and provided with a shifter collar 113. A positive clutch element 114 is fixed to the shaft 112, and a second positive clutch element 115 is formed on the pinion 111, as may best be seen in Fig. 11. A shipper member 116 fixed to a rockable shaft 117 has trunnions 118 mounted within a groove in the shifter collar 113 and is adapted to move the clutch element 115 into engagement with the clutch element 114 for causing the shaft 112 to drive the carriage in a return direction.

The carriage may be power returned to line-start position by the operation of a "return" key or may be returned to an intermediate position by operation of other keys, as fully explained in my prior Patent No. 2,306,564. The cariage may also be automatically power returned to line-start position upon reaching the left-hand margin stop, as also explained in said patent. However, inasmuch as the various ways in which a power carriage return may be instituted form no part of the present invention, only one manner of instituting a power return has been completely illustrated.

Referring now primarily to Figs. 1 and 11, a "return" key lever 119 is pivotally mounted as by means of a screw 120 and is urged against a stop 121 by a spring 122. A link 123 is urged toward the rear of the machine by a spring 124 and has its forward end mounted in a slot 125 in a stationary plate 126. Link 123 is provided with a notch 127, the forward edge of which is normally latched over the plate 126. At its front end, the link 123 carries an operating pawl 128, and at its rear end, said link is pivotally connected at 129 to an arm 130 fixed to one end of a cross-shaft 131. The opposite end of cross-shaft 131 carries an arm 132 to which is pivotally connected one end of a link 133, the opposite end of which is pivotally connected to a cam plate 134. The cam plate 134 is pivotally mounted upon the framework at 135 and is provided with a cam slot 136 within which is mounted a cam follower 137. Cam follower 137 is carried by one end of an arm 138 the opposite end of which is fixed to the hereinbefore mentioned rockable shaft 117. The arrangement is such that when the "return" key is depressed, the key lever 119 will, by striking the pawl 128, lift the front end of link 123 to unlatch the notch 127 from the plate 126. The spring 124 will then be effected to draw the link 123 to the rear and thereby rock the cross-shaft 131 in a clockwise direction, as viewed in Fig. 11. Clockwise rocking of cross-shaft 131 will cause the cam plate 134 to be moved to a position wherein the cam follower 137 will be in the opposite end of cam slot 136 and will serve to rock the arm 138 in such manner as to cause the clutch elements 114—115 to become engaged, whereupon the carriage will begin its return movement.

To allow a free return movement of the carriage, it is desirable to restore to an unprojected position any tabulator reed 17 which may be projected at the time that a power carriage return is instituted. For that purpose the cross-shaft 131 has fixed thereto an arm 139 one end of which is pivotally connected to the lower end of the previously mentioned link 105. Thus when the cross-shaft 131 is rocked as aforesaid to institute a carriage return, the arm 139 will pull down on the link 105, which in turn pulls down on the end of latch lever 100 to cause the stud 101 to become unseated from the latch stop 98 and allow any projected tabulator reed to be returned to its home position, as previously explained. The elongated slot 104 in link 105 allows the latch lever 100 to be operated when a tabulator reed is hit by a carriage stop without affecting the link 105 and consequently without instituting a carriage return operation.

After the carriage has been returned to its line-start position, or to one of the previously mentioned intermediate positions, it is necessary to disconnect the clutch 114—115, as will readily be understood. For that purpose, the carriage 11 is provided with a stop plate 200 and the base portion 10 carries a margin stop rack 201. The rack 201 is mounted for limited endwise movement and is urged to the left by a compression spring 202. A margin stop bar 203 parallels the rack 201 and carries a line-start margin stop 204. One end of bar 203 is pivotally connected to an arm 205 fixed to one end of a shaft 206. The opposite end of shaft 206 has fixed thereto an arm 207, which is pivotally connected to one end of a twisted link 208. The opposite end of link 208 is pivotally connected to the previously mentioned arm 132.

The margin stop rack 201 carries a plurality of intermediate margin stops 209, only one of which is shown. The stop plate 200 is provided with a plurality of tabs 210 for cooperating with either an intermediate margin stop 209 or with the line-start margin stop 204. It is fully explained in my above referred to prior Patent No. 2,306,564 how the intermediate margin stops 209 are moved to positions of cooperation or non-cooperation with the tabs 210, and since such arrangement forms no part of the present invention, it is not believed necessary to give further details here. Suffice it to say that when any of the tabs 210 strike either an intermediate margin stop 209 or the line-start margin stop 204, the bar 203 is moved endwise to the right, as seen in Fig. 11. Such rightward movement of the bar 203 will rock the shaft 206 which, through its arm 207, will pull the twisted link 208, which will in turn, through the arm 132 and link 133, restore the arm 134 to the position shown in Fig. 11. As previously explained, with the parts as shown in Fig. 11, the power carriage return is disconnected.

The present invention provides means whereby power carriage return may be foreshortened by merely depressing any tabulator key after a return movement has been instituted. The specific means employed for accomplishing this result comprises a cam 140 fixed to the cross-shaft 42 and an arm 141 fixed to the cross-shaft 131 and carrying a cam operated roller 142. As previously explained, the cross-shaft 42 is rocked clockwise from the Fig. 1 position to cause a tabulator counter-stop to be moved to tabulation stopping position when a tabulator key is struck. If the carriage return clutch 114—115 is engaged, the cross-shaft 131 will have been rocked clockwise as aforesaid and will have thereby positioned the roller 142 on arm 141 at a point to be engaged by the cam 140 during clockwise movement of cross-shaft 42. The cam 140 will, therefore, be effective to rock the cross-shaft 131 in a counterclockwise direction to thereby disconnect the carriage return clutch. It will be noted that such counterclockwise movement of cross-shaft 131 will also be effective to re-latch the notch 127 of link 123 to the plate 126.

Thus when a tabulator key is operated while a carriage return operation is in progress, the carriage return clutch is disconnected and the carriage continues to move in a return direction under the power of its own momentum, impeded by the force of the tabulating and letter-spacing spring motor, until the projected counter-stop is struck by a tabulator stop, whereupon the escapement mechanism resumes control, as previously explained, and the carriage comes to rest. Should there be no tabulator stop to the left of the projected counter-stop, the carriage will move in a return direction until it loses its momentum and will then be moved in a tabulating direction by its spring motor, until a tabulator stop 16 engages the projected reed 17 in tabulating direction.

In case it is desired to be able to tabulate through a column without coming to rest in said column, the head portion 18 of the highest order tabulator reed may have an offset tabulation stopping tooth 143, as clearly shown in Figs. 1 and 7. Certain of the column units 15 may be provided with a tabulator stop 144 for cooperating with the tooth 143. The stop 144 will be in addition to the tabulator stop 16. With this arrangement, it will be clear that when the highest order tabulator reed is projected, the carriage will not stop at any column which is not provided with a tabulator stop 144 and that when the carriage does arrive at a column corresponding to the stop 144, said stop will cause an arresting of the carriage in the manner described with respect to the tabulator stop 16. Of course, if skip-column tabulation is not desired, the head portion 18 of the highest order reed 17 will be made in a manner similar to the other head portions.

One of the features of the present invention is to prevent the institution of a tabulating movement while the carriage is in certain zones. This feature is of particular importance in the case of combined typewriting and computing machines. For example, when the carriage has been tabulated to a column in which an automatic total is to be printed, it is important to prevent further tabulation until the carriage has been letter-spaced step by step through each denomination order of the total-taking zone; otherwise the total is apt to be incompletely typed. The mechanism for preventing tabulation in certain zones will now be described.

Referring to Figs. 1, 7 and 8, it will be seen that a cam plate housing 145 carrying a plurality of cam plates 146 has been provided. The cam plates 146 are employed in selecting one or more registers, or totalizers, not shown. The registers are located in the computing base, and the selecting cam plates are operated by dogs 147 carried by the column units 15. Inasmuch as the operation and construction of the computing machine features form no part of the present invention, the same have not been illustrated, but reference may be had to my prior Patent No. 2,372,681 for the details thereof. It is sufficient to say that the cam plates 146 are rocked rearwardly about their lower edges from the full-line position to the dotted-line position, Fig. 1, for an automatic total-taking operation, and in their rearward positions said cam plates are operated by different dogs 147 than when they are in their forward positions.

The cam plates 146 are engaged by a comb 148 which is carried by a slide 149. The slide 149 is guided at one end by a slot in a plate 150 fixed to the cam plate housing 145 and at its opposite end by a slot in a plate 151 fixed to the base portion 10 of the typewriter. The slide 149 is urged toward the front of the machine by a spring 152 extending between a tab 153 on said slide and a tab on the plate 151. A cam beveled portion 154 is provided on the forward end of the slide and said slide is also provided with a latch shoulder 155. A slide operating pin 156 is carried by the highest order tabulator reed 17.

When the highest order tabulator reed is moved to tabulation stopping position, the pin 156 cams the slide 149 toward the rear to thereby rock the cam plates 146 to their rearward, or total-taking, positions. The slide is held in this rearward position by a latch 157. The latch 157 is pivotally mounted upon a stationary part by a screw 158, or otherwise, and is urged to latching position by a light spring 159, as seen in Fig. 8. When the slide 149 is moved to the rear, the latch 157 snaps down behind the shoulder 155 to thereby hold said slide in its rearward position.

Pivotally mounted upon the cam plate housing 145, as by means of a screw 160, is a lever 161. The lever 161 carries at one end a stud 162 which is loosely fitted between a pair of adjacent cam plates 146 and at its opposite end is pivotally connected to a slide 163. The slide 163 is provided with an elongated slot 164 through which extends a headed stud 165 for guiding said slide. The hereinbefore described bail member 76 is provided with a tail portion 166, and when all the parts are in normal position, as shown in Fig. 1, a rounded end of the slide 163 abuts a rounded end of the tail portion 166.

As the highest order tabulator reed is selected, the bail member 76 is rocked in a clockwise direction to cause engagement of the toothed pawl 52 with the rotating shaft 66, which in turn causes said selected reed to be projected into the path of a carriage carried tabulator stop, as previously explained. As the reed moves up, the cam plates 146 are rocked to the rear and thereby move the upper end of lever 161 to the rear. As the upper end of lever 161 moves to the rear, the forward end of slide 163 moves over the top of the now depressed tail portion 166, as will readily be understood. At the end of the tabulating run, the stop 144 will contact the tabulation stopping tooth 143 of the projected reed and said reed will consequently be restored to its unprojected position, as previously explained, but as long as the cam plates 146 remain in a rearward position, the slide 163 will maintain the bail member 76 in a rocked position so that no further tabulation may be instituted because, as hereinbefore explained, the pawl 52 cannot again be engaged with the shaft 66 until the bail member 76 has returned to allow the end of lever 62 to drop from the Fig. 4 position.

After the carriage has been letter-spaced through each denominational order, then as the carriage steps to the next letter-space position, a tappet 167 on the column unit 15 contacts and depresses a latch releasing jack 168. The lower end of jack 168 is provided with a tongue 169 extending through an opening in a tab 170 on one end of the latch 157. As the jack 168 is depressed, the latch 157 is rocked counterclockwise of the Fig. 8 position to release the shoulder 155 of slide 149 and thereby allow the spring 152 to return said slide to its forward position. Movement of the slide 149 to forward position will, of course, cause the slide 163 to move away from and free the tail portion 166 of bail member 76. Freeing of bail member 76 will allow the operator to again institute tabulating operations.

In Fig. 13 a modification of the means for preventing tabulation in certain zones is shown. In this form of the invention, a lever 171 is riveted or otherwise secured at 172 to the lower end of one of the cam plates 146. The lever 171 is pivotally mounted upon a stud 173 fixed to the cam plate housing. An L-shaped lever 174 is also mounted upon the stud 173, and a spring 175 extends between a stud 176 on one arm of the L-shaped lever 174 and a stud 177 on the lever 171. The other arm of L-shaped lever 174 is pivotally connected at 178 to one end of a push link 179, the end 180 of which is guided in a bracket 181. The bracket 181 is fixed to the framework by bolts 182, or otherwise. A rock lever 183 is pivotally mounted at 184 and is provided with a tab 185 which is held in abutment with the end 180 of push link 179 by means of a suitable spring, not shown.

With the construction shown in Fig. 13, as the highest order tabulator reed is projected to tabulator stop cooperating position, the bail member 76, which in this instance is not provided with the tail portion 166, is rocked clockwise from the Fig. 13 position before the cam plate 146 is rocked rearwardly. Thus as the cam plate 146 rocks rearwardly, the bail member 76 will be in the path of movement of the rock lever 183. Since the rock lever cannot be rocked in a counterclockwise direction at this time, the push link 179 cannot move, and the spring 175 will, therefore, yield. After the tabulator reed is struck and consequently restored to its Fig. 13 position, the bail member 76 is also restored to the Fig. 13 position, as hereinbefore pointed out. As the bail member 76 is restored, the spring 175 will cause the push link 179 to snap the rock lever 183 beneath said bail member. Thus it will be seen that with the Fig. 13 construction, the bail member 76 cannot again be operated as long as the cam plate 146 remains in its rearward position, and consequently tabulation cannot be instituted until after the latch tripping jack 168 has been operated to allow said cam plate to be restored to its forward position.

One advantage of the Fig. 13 construction over that of Fig. 1 is that with the Fig. 13 construction, the bail member 76 is locked in normal position, while in the Fig. 1 construction said bail member is locked in its rocked, or tabulation institution position, and that consequently with the Fig. 13 construction it is not possible to depress a tabulator key while the carriage is in a non-tabulating zone, thus immediately notifying the operator that the carriage is in such a zone.

While the particular mechanisms for preventing tabulation in certain zones have been illustrated as being a part of the total-taking mechanism of a combined typewriting and computing machine, it is to be understood that this part of the invention is not limited to such machines but may readily be adapted for preventing tabulation in certain zones in typewriting machines generally.

It is to be distinctly understood that while certain details of the construction and arrangements of parts have been described, the invention is not limited to those details but is limited only to the scope of the appended claims.

I claim:

1. A typewriting machine comprising a base portion and a latter-spaceable paper carriage, a tabulator stop on said carriage, a plurality of decimal tabulator counter-stops mounted upon said base portion, a common mechanism for power projecting said counter-stops into the path of movement of said tabulator stop, means for individually selecting said counter-stops for power projection by said common mechanism, and means associated with said counter-stops for causing restoration to an unprojected position of any projected counter-stop whenever said counter-stop is struck by said tabulator stop in either direction of carriage travel.

2. A typewriting machine comprising a non-letter-spaceable part and a letter-spaceable part, a tabulator stop on one of said parts, a plurality of decimal tabulator counter-stops on the other of said parts, means for individually selecting said counter-stops for movement into a position to be struck by said tabulator stop, a common mechanism for power moving any selected counter-stop, latch means associated with said common mechanism for holding same in an operated condition to thereby hold said selected counter-stop in a moved position, and means associated with said counter-stops for releasing said latch means whenever said moved counter-stop is struck by said tabulator stop in either direction of travel of the letter-spaceable part.

3. A typewriting machine comprising a base portion and a letter-spaceable paper carriage, a tabulator stop for said carriage, a plurality of decimal tabulator counter-stops for cooperating with said tabulator stop, means for individually selecting said counter-stops for projection into the path of movement of said tabulator stop, a common mechanism for power projecting any selected counter-stop, latch means associated with said common mechanism for holding same in an operated condition to thereby hold said selected counter-stop in a projected position, and means associated with said counter-stops for releasing said latch means whenever said projected counter-stop is struck by said tabulator stop in either direction of carriage travel.

4. For use in a typewriting machine, a decimal tabulating mechanism comprising a group of denominational tabulator stop reeds, resilient means for normally holding said reeds in an inactive position, means for selecting any one of said reeds for operation, a bail member for projecting the selected reed to a tabulation stopping position, a latch for holding said bail member operated to thereby hold said reed in a tabulation stopping position, and means associated with said reeds and operatively connected to said latch to cause said latch to release said bail member and thereby allow the resilient means to return the projected reed to its normal position whenever said reed is struck from either side.

5. In a typewriting machine, a constantly rotating power shaft, a decimal tabulating mechanism comprising a group of denominational tabulator stop reeds, resilient means for normally holding said reeds in an inactive position, a first bail member, means for selectively moving any of said reeds into a position to be operated by said bail member, a second bail member constructed and arranged to be moved by any of said reeds whenever a reed is moved to a position to be aperated by said first bail member, and means operable by said second bail member to operatively connect said first bail member to said power shaft whereby said first bail member will be moved by said power shaft and thereby cause the selected stop reed to be moved to a tabulation stopping position.

6. A typewriting machine adapted to print in various zones and comprising a non-letter-spaceable part and a letter-spaceable part, an escapement mechanism which while engaged allows said letter-spaceable part to be moved in a letter-feeding direction with a step-by-step motion only, a plurality of tabulator stops on one of said parts, a group of counter-stops carried by the other of said parts, means for selectively moving any of said counter-stops to a position to be struck by one of said tabulator stops, means associated with said first mentioned means for causing release of said escapement mechanism whenever a counter-stop is moved to tabulation stopping position, and means to prevent tabulation in a certain zone responsive to movement of a preselected counter-stop.

7. A typewriting machine adapted to print in various zones and comprising a non-letter-spaceable part and a letter-spaceable apart, an escapement mechanism which while engaged allows said letter-spaceable part to be moved in a letter-feeding direction with a step-by-step motion only, a tabulator stop on one of said parts, a counter-stop carried by the other of said parts, means for moving said counter-stop to a position to be struck by said tabulator stop, a latch for holding said means operated and consequently holding said counter-stop in a tabulation stopping position, means associated with said first mentioned means for causing release of aid escapement mechanism whenever said counter-stop is moved to tabulation stopping position, means associated with said counter-stop to cause said latch to be released when said tabulator counter-stop is struck by the tabulator stop in a letter-feeding direction, and means to prevent tabulation in a certain zone responsive to movement of said counter-stop.

8. A typewriting machine adapted to print in various zones and comprising a non-letter-spaceable part and a letter-spaceable part, an escapement mechanism which while engaged allows said letter-spaceable part to be moved in a letter-feeding direction with a step-by-step motion only, a plurality of tabulator stops on one of said parts, a group of counter-stops carried by the other of said parts, means for selectively moving any of said counter-stops to a position to be struck by one of said tabulator stops, a latch for holding said means operated and consequently holding said counter-stop in a tabulation stopping position, means associated with said first mentioned means for causing release of aid escapement mechanism whenever a counter-stop is moved to tabulation stopping position, means associated with said counter-stops to cause said latch to be released when any tabulator counter-stop is struck by a tabulator stop in a letter-feeding direction, and means to prevent tabulation in a certain zone responsive to movement of a preselected counter-stop.

9. A typewriting machine comprising a base portion and a letter-spaceable paper carriage, means to drive said carriage in a letter-spacing direction, an escapement mechanism normally restraining said carriage to move with a step-by-step motion, a plurality of tabulator stops on said carriage, a plurality of tabulator counter-stops on said base portion, a continuously rotating power shaft within said base portion, means to selectively operatively connect any of said counter-stops to said power shaft whereby said counter-stop will be moved from a normal inactive position to a tabulator stop intercepting position, means operable during the movement of said counter-stop to release said escapement mechanism and thereby allow the driving means to move said carriage freely in a letter-spacing direction until a tabulator stop strikes said counter-stop, means to restore the intercepting counter-stop to inactive position and restore the carriage to the control of the escapement mechanism when said conuter-stop is struck by a tabulator stop in letter-spacing direction, and a zone control mechanism effective upon operation of a predetermined counter-stop to prevent further tabulation until said carriage has been letter-spaced step by step through a predetermined zone.

10. A typewriting machine comprising a base portion and a letter-spaceable paper carriage, an escapement mechanism which while engaged allows said carriage to be moved in a letter-feeding direction with a step-by-step motion only, a tabulator stop on said carriage, a group of denominational counter-stops carried by said base portion, means for selectively projecting any of said counter-stops from a normally retracted position to a position to be struck by said tabulator stop, said means being effective to disengage said escapement mechanism during the time that said counter-stop is projected, means for causing said counter-stop to return to its normal unprojected position when struck by said tabulator stop in tabulating direction, and a zone control means responsive to projection of the highest order denominational counter-stop to prevent further tabulation until after said carriage has been letter-spaced step by step through all denominational order positions.

11. A typewriting machine comprising a non-letter-spaceable part and a letter-spaceable part, a rack carried by said letter-spaceable part, a pinion carried by said non-letter-spaceable part and meshed with said rack, a clutch for connecting said pinion to a source of power whereby when said clutch is engaged the pinion will be effective to drive said letter-spaceable part in a return direction, a tabulator stop on one of said parts, a plurality of tabulator counter-stops mounted upon the other of said parts, resilient means for normally holding said counter-stops in an inactive position, means for individually selecting said counter-stops for movement into a position to be struck by said tabulator stop, a common mechanism for moving any selected counter-stop, latch means associated with said common mechanism for holding same in an operated condition to thereby hold said selected counter-stop in a moved position, means associated with said counter-stops to cause a release of said latch means whenever any counter-stop is struck by a tabulator stop in either direction of travel of the letter-spaceable part, and means to cause a release of said latch means whenever said clutch is engaged, whereby when a power return of the letter-spaceable part is instituted any previously moved counter-stop will be allowed to return to ineffective position and thereby permit a complete return of the letter-spaceable part to line-start position.

12. A power operated typewriting machine comprising a base portion and a letter-spaceable paper carriage, a tabulator stop on said carriage, a projectable tabulator counter-stop mounted upon said base portion, a rotating power shaft mounted in said base portion, means for operatively connecting said counter-stop to said rotating power shaft for projection thereby into the path of movement of said tabulator stop, and means operable in response to engagement of said tabulator counter-stop by said tabulator stop in either direction of carriage travel to return said projected tabulator counter-stop to its normal unprojected position.

13. A power operated typewriting machine comprising a base portion and a letter-spaceable paper carriage, a tabulator stop on said carriage, a projectable tabulator counter-stop mounted upon said base portion, a rotating power shaft mounted in said base portion, means for operatively connecting said counter-stop to said rotating power shaft for projection thereby into the path of movement of said tabulator stop, and means associated with said counter-stop for causing restoration thereof whenever said counter-stop is struck by the tabulator stop in either direction of carriage travel.

HENRY L. PITMAN.

REFERENCES CITED

The following references are of record in the file of this patent:

UNITED STATES PATENTS

| Number | Name | Date |
|---|---|---|
| 987,766 | Spiro | Mar. 28, 1911 |
| 1,130,875 | Barr | Mar. 9, 1915 |
| 1,609,943 | Hart | Dec. 7, 1926 |
| 1,824,099 | Pitman | Sept. 22, 1931 |
| 2,353,095 | Von Reppert | July 4, 1944 |